Patented June 14, 1932

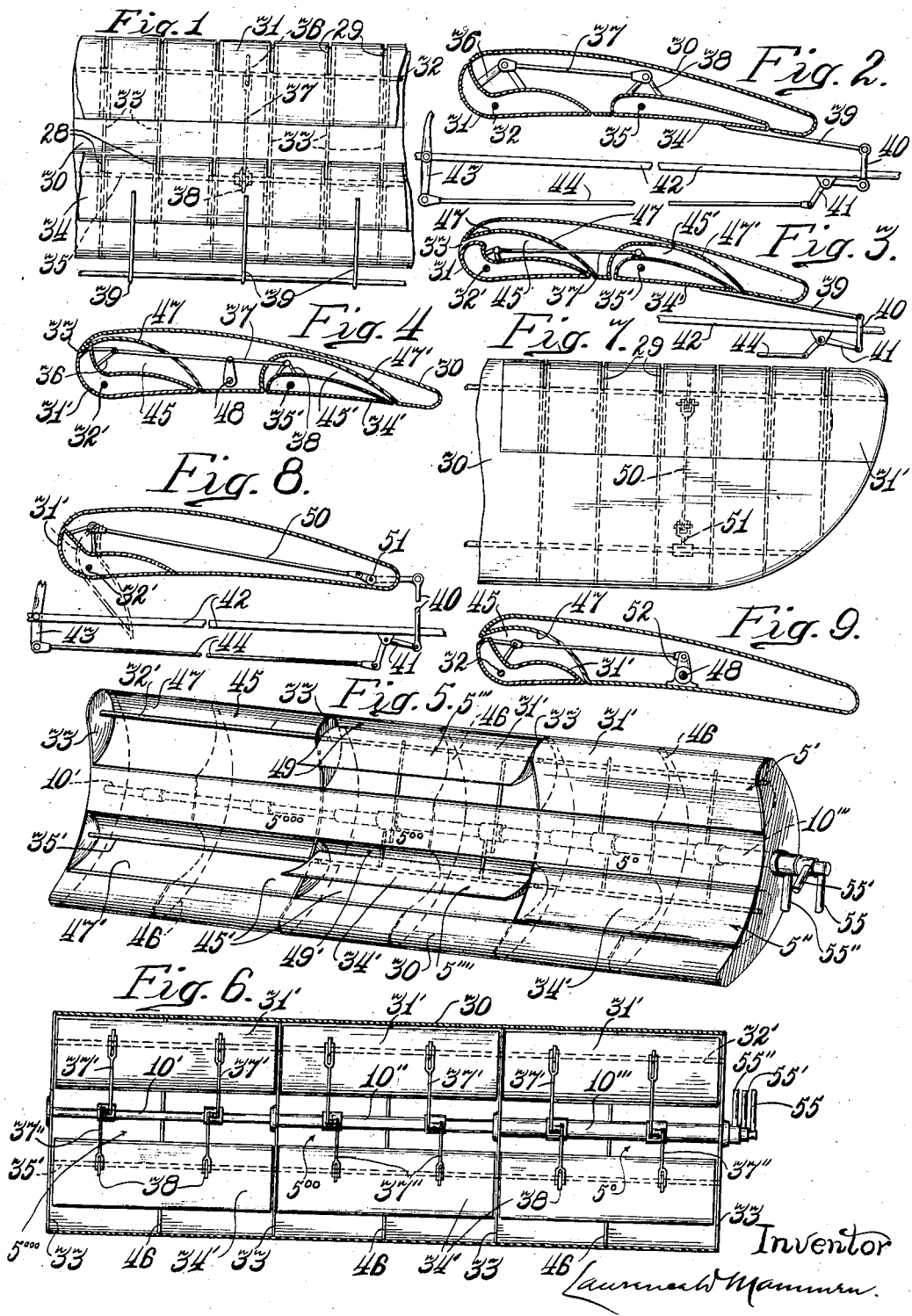

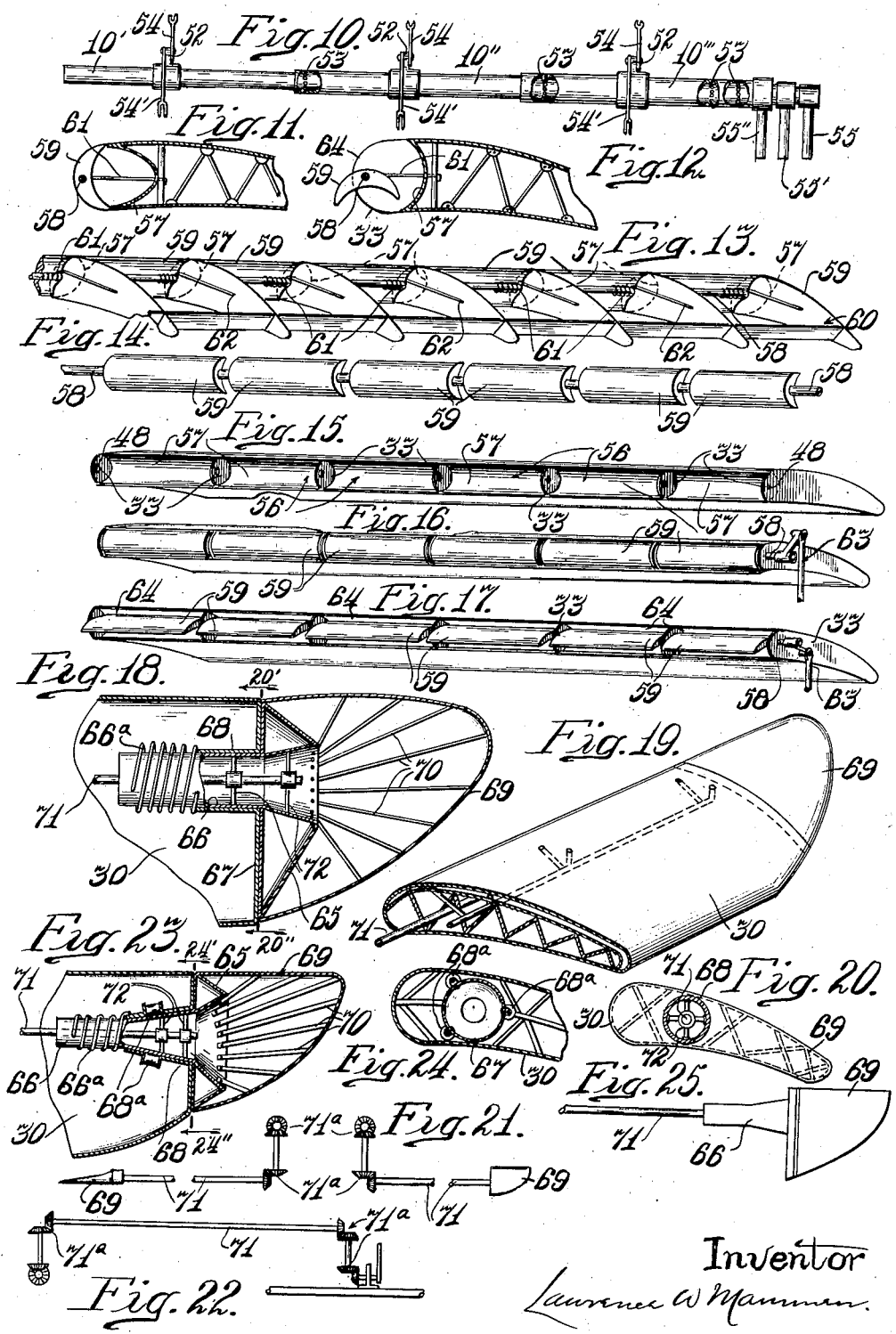

1,862,795

UNITED STATES PATENT OFFICE

LAWRENCE W. MAMMEN, OF CHICAGO, ILLINOIS

MOVABLE SECTIONS IN WINGS FOR AIRCRAFT

Application filed April 18, 1930. Serial No. 445,389.

The figures shown and described in this application and numbered 1—2—7—8—18—19—20—21 and 22, are the same as those shown and described and numbered as Figures 25—26—27—28—29—30—31—32 and 33 respectively in application No. 371,546, filed June 17, 1929, of which this application is a continuation in part.

The object of my invention is:

To provide a structure where the underside or the leading edge of the wings or planes are divided into separately movable portions normally constituting parts of the wings or planes, said portions being preferably independently operable to assume positions at an angle to the horizontal axis of the wings or planes in order to offer resistance to the forward travel of the craft and thus acting as "braking elements", whereby the movement of the aircraft forwardly may be retarded or its course may be readily altered and the craft caused to swing or turn from the direction in which it is travelling, also To provide a means of changing the curvature of the underside of the wing, thus enabling a stalling plane to right itself and glide slowly to the ground, also To provide the leading edge of a wing with a hollow, walled space, between the ribs, in which movable wing sections are securely mounted on a shaft or rod, running the length of the wing, and which rod may be tilted at will by the pilot,—thus admitting an air-pressure in this hollow, that will hold the craft and prevent nose dives, also To provide the ends of the wings of an aircraft with separately movable tip portions for controlling the direction of flight independently of or in connection with the regular rudder arrangements, and To provide the larger aircraft with such additional means in steering, unhampered by the air currents along the fuselage and also To provide an emergency aid for multi-powered planes to keep in balance when such power, in part, becomes disarranged or is not pulling evenly, also To provide a practical, positive, simple and economical means for operating such wing sections separately by the pilot.

The following detailed description of the accompanying drawings explains the constructions and the advantages of my invention.

Fig. 1 is an inverted plan view of a portion of a wing, provided with a number of movable wing sections or "brakes" with a portion of the controlled mechanism.

Fig. 2 is a sectional elevation of a wing and its normal sections, shown in Fig. 1, with the control mechanism in side elevation.

Fig. 3 is a sectional elevation of a wing and its normal movable sections, in place, with its control mechanism in side elevation. This wing has its underside and leading edge spaced lengthwise, between ribs and across other ribs that have been shaped to conform to certain predetermined shaped hollow spaces, which are separated from the interior of the wing by a suitable lining and into which the upper portion of the pivoted wing sections move, when tilted.

Fig. 4 is a sectional elevation of a wing and its normal sections as shown and described in Fig. 3, with mechanism of control as in Figs. 5, 6 and 10.

Fig. 5 illustrates a portion of the underside of a wing in three divisions, divided lengthwise in hollow spaces, as described in Fig. 3, in which four movable wing sections are pivoted and in place, one division, 5°, being closed, illustrates the normal shape of the wing, another division, 5°°, being open shows various features obtainable and the third division, 5°°°, is left empty, the better to show the hollow spaces, their linings and the cut out portions of the intervening ribs. A tubular, telescopic mechanism for rotating the sections separately, is also shown.

Fig. 6 is an upper view of the tubular, telescopic control mechanism, as attached to the various wing sections, located with its central bearings in the ribs (the upper portion of the wing is removed).

Fig. 7 is an inverted plan view of a portion of a wing, provided with a single movable section.

Fig. 8 is a sectional elevation of the wing with a single movable section and the controlling mechanism in side elevation.

Fig. 9 is a sectional elevation of a wing with a single movable section along the leading edge, pivoted to move in a defined hollow, walled space, lying between the regularly shaped ribs, the intervening ribs being cut to accommodate this walled hollow into which the upper part of the pivoted wing section moves, when tilted, and its control mechanism in side elevation.

Fig. 10 is a control mechanism, tubular and telescopic, to operate with a minimum of friction and for separate operation of the sections.

Fig. 11 is a portion of wing in sectional elevation, with a hollow, walled leading edge and a tiltable section mounted therein, forming a normal leading edge.

Fig. 12 is a portion of wing in sectional elevation, with a hollow, walled leading edge, and a section forming the normal leading edge, such section fastened fixedly on the rod with bearings in front part of ribs and moving with this rod, shown tilted and open.

Fig. 13 is a rear view seen from above of a skeleton frame of a wing with the leading edges tiltable wing sections in place, and springs fastened to the same rod and to the frame and an outline in dots on the ribs showing the shape of the walled portion, when in place.

Fig. 14 is a wing edge portions fixedly mounted on rod with spaces open to accommodate the width of the ribs of the frame.

Fig. 15 is a wing showing the hollow portions of the leading edge between the ribs; also the bearings for the rod on which the wing edge portions are mounted as in Fig. 14.

Fig. 16 is a wing with movable edge sections in place and closed and the control mechanism for the same.

Fig. 17 is a wing with the movable edge sections in place and open and control mechanism for the same.

Fig. 18 is an inverted sectional plan view of the outer end of a wing, showing my improved movable tip section.

Fig. 19 is a perspective view of the outer end of a wing with my movable tip section.

Fig. 20 is a cross sectional view of a wing as viewed along the line 20'—20'' of Fig. 18.

Fig. 21 is a schematic view illustrating a manner of controlling the movable tip sections at opposite ends of a wing, the wing proper being omitted, and one tip shown tilted at an angle to the axis of the wing proper.

Fig. 22 is a schematic view of a portion of the mechanism for controlling one of the movable tip sections.

Fig. 23 is an inverted sectional plan view of the outer end of a wing with my movable tip section—with rollers mounted in the sleeve in which the hub of the wing tip is rotated, to cut friction in operation.

Fig. 24 is a portion of a cross sectional view of a wing as viewed along the line 24'—24'', showing the hub receiving portion with the roller bearings.

Fig. 25 is a wing tip with control rod, ready for mounting in the wing.

My invention relates, in particular, to improvements in wing construction, by which the under side and the leading edge of a wing is divided into movable sections and the ends of such wings are provided with movable tips, adapted as an aid in steering the craft or as braking for the purpose of lowering the landing speed or as safety measures to right the craft when stalling or nose diving.

A description of these features is given in the following order:

Moving sections along the leading edge or rearwardly thereto as illustrated in Figs. 1 and 2, which show these sections as normally located within the plane or the outline of the wing, and mounted so as to be separately movable; that is to say, the sections constitute a part of the wing proper, but are arranged so that they may be moved or given an inclination different from that of the main portion of the wings. In Figs. 1 and 2 I show the forward longitudinal edge portion of the wing 30 provided with a section 31, which is pivoted at 32. This section is shown as between ribs, but may extend continuously throughout the forward edge of the main wing, with the section 31 constituting a part of the forward edge, when said section is in normal position, where it extends within the normal plane or outline of the wing proper, in which case the forward edge of the section is spacedly slotted 29 to allow passage over the ribs when the section is tilted; the section therefore also constitutes a part of the lower face of the main wing at the forward part thereof, as shown in Figs. 1 and 2. The pivot point or rod 32 has proper bearing in the usual cross ribs or framing of the wing, said framing being indicated in dotted lines at 33 in Fig. 1. By forming the movable section 31, as disclosed in Fig. 2, it is apparent that movement of the section into an inclination different from that of the main portion of the wing is readily accomplished because the section constitutes a part of the forward or leading edge. The forward edge of the section will tilt up into the wing proper, thus allowing the air to rush through the opening forward of the pivoted point 32 into the wing proper; a portion of the air striking the upper inside of the wing covering and is then deflected against the rear side of the wing section 31 in passing outward. This will not only permit the section to be easily opened, but the air entering the main wing will tend to right the aircraft against sudden downward movement or nose dive, while the outwardly moved section will also assist in righting the craft in the event of motor stalling and permit a gradual descent. At the same time, the sections will act as brakes against forward travel when found necessary, for instance to slow up the landing speed of the plane.

Any suitable mechanism may be employed for operating the movable sections, arranged to be controlled by the pilot. Figs 1 and 2 also illustrate the wing 30 provided with a separate movable section 34, arranged rearward of the forward section 31 and likewise normally located wholly within the wing proper. This section 34 is pivoted at 35, so as to permit the major portion of the section to move downwardly, out of the lower side of the wing. This section is likewise tiltable between ribs as shown, but its upper portion is spacedly slotted 28 when extending over several ribs for passage over such ribs when tilted.

As an example of means for controlling the sections, I show the section 31 provided with the bell-crank type of arms 36 located at intervals apart throughout the width of the section, and secured to the section 31, so as to cause the section to tilt about the rod 32, and the upper end of these arms are pivotally connected to links 37 which have their rear ends pivotally connected to the forked or bell-crank arms 38, connected to the sections 34. The sections 34 are also provided with rods 39 which extend rearwardly and are pivotally connected to a link 40 which in turn is connected to bell-crank lever 41 shown pivotally mounted beneath the floor 42 and which is controlled by a suitable lever 43, through reach rod 44.

In Figs. 3-4-5-6 the wing 30 is built with hollowed sections 45 forward, along the leading edge and underside of the wing and 45' on the underside rearwardly thereto; the hollow sections are located between the regularly shaped ribs 33, the intervening ribs 46 being shaped to accommodate these linings or walls 47 and 47' of these hollow spaces. A shaft or rod 32' runs the length of the wing 30 on which sections 31' are pivoted. Another rod or shaft 35' extending the length of the underside of the rear part of the wing 30 has the sections 34' pivoted thereon. These shafts have proper bearings in the regularly shaped ribs or framing of the wing. When these sections are closed as 5' and 5'', they form a normally shaped wing and function as such, while when open, fully or partially as 5''' and 5'''', they change the contour of the underside of the wing, thus changing the speed and increasing the lifting power of the wing, which will allow the craft of moving forward at a very low rate of speed. When sections 31' and 34' are opened, lengthwise, slots are formed as 49 and 49' between the edges of the movable sections as in 5''' and 5'''' and the walled hollow spaces of the wing proper. A section of Fig. 5 is shown without the movable sections inserted, so as to illustrate the hollow portion and the build of this kind of a wing. It is obvious that as the movable sections are opened the air will rush through the slots as at 49 and 49' and strike the lining or wall of the hollow space and being deflected, a good portion of it will hit the rear side of the wing sections in passing out. This acts as previously described in Fig. 2.

The telescopic tubular mechanism as shown in Figs. 4-5 and 6, allows each section an independent movement. This will be described in Fig. 10.

In Figs. 7 and 8 I illustrate portions of the wing provided with a single section 31', arranged at the forward edge of the wing; the section 31' being similar to section 31 previously described and controlled by similar mechanism, except that the link 50 is connected to the oscillatingly mounted arm 51. It is apparent that upon pulling the lever 43 toward the right, it will cause the sections to tilt about their pivot into the position shown in dotted lines in Fig. 8. This leading edge section is tiltable as shown when situated between ribs, but where a continuous section is built over several normally shaped ribs, its upper edge is spacedly slotted 29 for passage over such intervening ribs, when tilted.

Fig. 9 shows a wing built with the forward leading edge and forward underside forming a hollow spacing 45 between the ribs, as previously described, and having a lining or wall 47. The sectional movable wing-piece is pivoted at 32 and may be tilted about its pivot point by means of turning the tubular mechanism to which the oscillatingly moving arm 52 is attached.

A tubular mechanism for moving the wing sections, as shown in Fig. 10 may be used for operating a number of independently operatable sections. It is shown here for three sections. It consists of three tubes, the smaller or 10', extends the full length through the three sections, the one over this 10'' has a length of two sections and the one over this 10''' is only one section long. Between the tubes are allowed small spacings to accommodate crates of ball bearings, in order to assure safe and easy operation, without hindrance of unnecessary friction as at 53. Each section has one or more arms 52 fixedly secured thereto, so as to cause the sections to tilt about their pivot rods or shafts (32' and 35' as in Fig. 6). The ends of the links 54 and 54'; are forked and pivotally connected to the sections. Levers 55, 55' and 55'' are attached to each sectional tube and may be operated separately. Other convenient means for rotating these tubes may be arranged, for instance such as a sprocket wheel and chain.

In Figs. 11 and 12 are shown a sectional elevation of a wing with a hollow leading edge, which is further illustrated in Fig. 15. These hollow edge spaces are located between the ribs 33. A concave wall or lining 57 comprises the wing edge proper. In each rib is a suitable opening for bearing 48 for the shaft 58, which runs through the full length of the wing edge. On this shaft sections are fastened, properly spaced to conform with the distances between the ribs, to fill the space 59 and when normally in place, these sections constitute the outer portion of the leading edge and thus completes the shape of the wing as shown in Fig. 16. These sections move with the shaft and when tilted they form a slot 64 between the wing hollow and the tilted section as shown in Fig. 17. This slot opening provides a means for the wind pressure to reach the back portion of the hollow and being deflected it strikes the rear portion of the sections when leaving, thus having an exceptional force and leverage for righting a falling plane.

In Fig. 13 I show a rear view of a frame skeleton 60 of a wing with the rod 58 and the wing sections 59 mounted thereon and in place. Springs 61 with one end fixedly fastened to the rod or shaft and the other end fixedly fastened to the ribs of the frame as at 62, make the closure of the section automatic, as soon as released. The mechanism for tilting is shown as 63 in a simple method of leverage, similar as that described in Figs. 2 and 8. However various practical mechanisms may be used for this purpose.

In Figs. 18–19–21 and 23 I also show the outer ends of the wings 30, provided with separately movable wing tips 69. These tips are formed to carry out the general contour of the wing proper, tapering toward their outer ends and provided internally with a suitable supporting frame or shell 65, preferably of sheet metal, see Figs. 18 and 23, which terminates in a tubular hub portion 66. This hub portion fits into an end frame 67 of the wing proper, so as to rotate therein; the frame 67 of the main wing 30 being made to provide the hub-receiving and supporting sleeve 68. The shell-frame 65 is preferably flared within the tip 69 and is provided with a series of flexible radiating ribs 70, which may be of rattan, wound with wire, or of flat steel, so as to permit slight flexing of the tips during rotation or turning of the tips, so as not to present too great or sudden resistance to the air pressure of the moving wing when the tips are rotated. That is to say, the ribs 70 permit a slight rearward flexing of the tips 69, when the latter are rotated at an angle to the direction of flight; the ribs 70 being adapted to gradually straighten the tip. The tip is covered with flexible material or has spaces of such material or other means to permit a flexing of the covering. The hub 66 and sleeve 68 may be so formed or provided with means which will act as a stop, whereby to determine the normal position of the tip, and also prevent complete or entire rotation thereof, namely a stop which will permit the tip to merely rotate ninety degrees from normal. The shell-housing 65 is controlled by means of a suitable tube or shaft 71, connected to the shell-housing 65 by means of the spiders 72; the tube or shaft 71 being controlled in any suitable manner by the pilot; with the control mechanism being such that the tip at the opposite side of the aircraft may be separately controlled. This control mechanism is preferably connected with the means for controlling the rudder of the aircraft (not shown), so that the tilting of a tip 69, say at the right side of the aircraft, will cause the rudder (not shown) to move toward the right side, and vice versa, when the tip to the left is operated. It is apparent that with this construction, the aircraft may be readily steered in its course, as a turning of the tips about their horizontal axis will enable comparatively sharp, short turns to be made, when occasion requires. In Figs. 21 and 22 I schematically illustrate the wing tips with a control means, showing one of the tips turned out of normal position into a vertical direction, which may be accomplished by rotating the shaft or rod 71 operated by means of the bevel gears and shafts shown at 71ª, in Figs. 21 and 22, or any other suitable mechanism may be employed for controlling the wing tips separately, as previously stated.

In order to induce the tips 69 to automatically return to normal position, when the operating mechanism 71ª is released, I show the hub 66 provided with a coil spring 66ª one end whereof is fixedly secured to the hub 66, while the other end is fixedly secured to the sleeve 68. In the hub receiving and supporting sleeve 68 is inserted, lengthwise situated, rollers 68ª, two of which are shown in side elevation in Fig. 23 and three in cross section in Fig. 24. These rollers rest in bearings, fixedly secured to the sleeve 68, with only enough of their flat surfaces extending into the sleeve 68 for the purpose of taking up the friction of the tubular hub portion 66, when rotated, and prevent the metal surfaces of the sleeve 68 and hub 66 from "freezing" or sticking together.

I have described what I believe to be a simple embodiment of my invention, in terms employed merely as terms of description and not as terms of limitation, as structural modifications are possible and may be made without, however, departing from the spirit of my invention.

What I claim is:

1. In an aircraft having wings, sections pivotally mounted along the leading edge and the underside of such wings, such sections forming a portion above and another portion below the pivoted point, which upper portion swings into the wing and its lower portion out from the wing, when operated and admits air into the wing.

2. In an aircraft having wings, that have hollow, walled spaces located along the leading edge and the underside of such wings, in which hollow spaces, wing sections are pivotally mounted so as to form a naturally shaped wing when in place and when operated admitting an air pressure into these walled spaces.

3. In an aircraft having wings which have sectional portions that are hollow along the leading edge and their underside, in which hollows, wing sections are pivotally mounted to form a naturally shaped wing when in normal position, and means whereby such pivoted sections may be operated to admit a rush of air into these hollows.

4. In an aircraft having wings with hollow spaces along its underside and its leading edge, ribs shaped to accommodate such hollow spaces, a wall or lining confining the shape of such spaces, shafts or rods lengthwise disposed in such hollow spaces, sectional wing portions pivotally mounted on said shafts, and means whereby such wing sections may be moved through a vertically disposed arc to admit an inrush of air into such hollow space.

5. In an aircraft having wings with hollow spaces along the underside and the leading edge, a lining confining the shape of such hollow spaces, sections of wing mounted pivotally therein, which when tilted move inwardly into the hollow wing space and form slots along the upper edges of the wing sections with the upper edges of the hollow spaces, for the admission of air into the hollow wing spaces and outward passage of air to the rear thereof, and means for controlling such movement of the sections.

6. In an aircraft having wings, which have a hollow leading edge with a shaft pivotally mounted in bearings in the ribs along the leading edge of such wings, sectional wing portions fixedly mounted on said shaft to form the leading edge, as of a normal wing and means for tilting such shaft to admit an air pressure into said hollow leading edge.

7. In an aircraft having wings, which have their leading edge hollowed in spaces between the ribs, a lining, lengthwise confining the shape and depth of said hollow space, wing sections fixedly mounted on a shaft running the length of the wing, to form a normal leading edge and means for tilting said shaft to admit an air pressure into the hollowed spaces.

8. In an aircraft having wings, hollowed portions located along the leading edge between the ribs of such wings, and a movable shaft with wing sections fixedly secured thereto, means for tilting such shaft and such wing sections, the upper portion of such sections tilting inwardly into the hollow wing spaces, the lower portion of the sections tilting outwardly from said hollow spaces and when so tilted, a slotted edge is formed for the inrush of air between the upper wing edge portion and the upper portion of the walled hollow and for the exit of this air between the tilted wing sections and the lower edge of the hollow portion of the wing.

9. In an aircraft having wings with movable sections pivotally mounted along the leading edge and the underside, which sections comprise an upper portion above and a lower portion below the pivoted point, a number of elongated slots spacedly arranged on the forward edge of the upper portion of such movable section, to correspond with the number and position of the ribs of the wing, in order that this upper portion of the wing section may pass over these ribs, when tilted into the wing.

10. In an aircraft wing with movable sections comprising its leading edge, the outside of these sections being shaped to conform to the desired contours of the wing and the inside having a concave surface.

11. In an aircraft wing having a hollow leading edge, a lining or wall confining the shape of such hollow, wing sections movably mounted to form a normal leading edge, the outside of which conforms to the desired contour of the wing, and the inside being of a concave shape, which, when the movable wing sections are tilted form the combination of a changed contour of the otherwise normally shaped wing, a concave wing surface in front thereof, and in between these a slotted opening admitting a pressure of air against the walled back of the hollow, which air continues along the wall and passes out below the wing proper.

12. In aircraft provided with wings, the outer ends whereof have transverse frames provided with openings, tip sections disposed at the outer ends of the wings, said tip sections having frames journaled in the frame openings at the outer ends of the wings, so as to permit rotation of the tip sections through vertically disposed arcs, said tip section frames involving flexible ribs radiating toward the outer ends of the tip sections and means for independently rotating the tip sections at the opposite outer ends of the wings.

13. In aircraft having wings, the outer ends of which have transverse frames with sleeved openings, tip sections, constituting a frame portion, which inner side has a tubular hub, journaled in said sleeved opening, and its outer side a portion flattened and broadened to receive a number of flexible ribs, and means to independenty operate the same.

14. In an aircraft having wings with movable sections pivoted within such wings, a tubular, telescopic mechanism with bearings in the ribs of such wings, pivotally movable arms secured to said tube sections, said arms pivotally connected to the wing sections, wherewith each section may be tilted independently of the other.

15. In aircraft having wings with movable sections, a tubular, telescopic mechanism with bearings in the ribs of the wing, pivotally movable arms secured to said tube sections, and turning with said tube, and connected to the movable wing sections, and means for turning such tube sections with the pivoted arms, thereby tilting each section independently of the other.

16. In aircraft wings, tip sections journaled at the outer ends of said wings, so as to normally extend in the plane of the wing, with ribs and cover to flex under pressure when rotated, and means to operate the same.

LAWRENCE W. MAMMEN.